(12) United States Patent
Hirai et al.

(10) Patent No.: US 10,047,881 B2
(45) Date of Patent: Aug. 14, 2018

(54) FUEL HOSE

(71) Applicant: Sumitomo Riko Company Limited, Komaki-shi, Aichi (JP)

(72) Inventors: Ryo Hirai, Iwakura (JP); Yoshiki Kodaka, Kasugai (JP); Kazuki Hatanaka, Kasugai (JP); Ryousuke Kanegae, Komaki (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 0 days.

(21) Appl. No.: 15/342,344

(22) Filed: Nov. 3, 2016

(65) Prior Publication Data

US 2017/0067581 A1  Mar. 9, 2017

Related U.S. Application Data

(63) Continuation of application No. PCT/JP2015/058166, filed on Mar. 19, 2015.

(30) Foreign Application Priority Data

Jun. 30, 2014 (JP) .................................. 2014-133877

(51) Int. Cl.
*F16L 11/00* (2006.01)
*F16L 11/08* (2006.01)
(Continued)

(52) U.S. Cl.
CPC ................ *F16L 11/08* (2013.01); *B32B 1/08* (2013.01); *B32B 5/024* (2013.01); *B32B 5/026* (2013.01);
(Continued)

(58) Field of Classification Search
CPC .................................................... F16L 11/08
(Continued)

(56) References Cited

U.S. PATENT DOCUMENTS

| | | | |
|---|---|---|---|
| RE32,230 E | * | 8/1986 | Satoh .................... F16L 11/085 138/123 |
| 5,084,314 A | * | 1/1992 | Igarashi ................ F16L 11/085 138/125 |

(Continued)

FOREIGN PATENT DOCUMENTS

| | | |
|---|---|---|
| JP | 5-44874 A | 2/1993 |
| JP | 2000-2376 A | 1/2000 |

(Continued)

OTHER PUBLICATIONS

Notification of Transmittal of Translation of the International Preliminary Report on Patentability (Form PCT/IB/338) issued in counterpart International Application No. PCT/JP2015/058166 dated Jan. 12, 2017 with Forms PCT/IB/373, and PCT/ISA/237 (17 pages).

(Continued)

*Primary Examiner* — James Hook
(74) *Attorney, Agent, or Firm* — Westerman, Hattori, Daniels & Adrian, LLP

(57) ABSTRACT

A fuel hose is provided, which includes an inner tube including a rubber layer and a rubber layer, a resin layer provided around an outer periphery of the inner tube and comprising a thermoplastic resin as a major component, and an outer tube provided around an outer periphery of the resin layer and including a reinforcement thread layer and a rubber layer. The inner tube of the fuel hose has a dynamic loss (Tan δ) of 0.3 to 1.2. The fuel hose has an outer diameter change ratio of not greater than 10% and a volume change ratio of not less than 15% when the internal pressure of the hose is increased by 1 MPa. The fuel hose is less costly, and has a fuel permeation resistance (fuel barrier property) as well as a pulsation suppressing property.

16 Claims, 3 Drawing Sheets

(51) Int. Cl.

| | |
|---|---|
| *B32B 25/08* | (2006.01) |
| *B32B 25/10* | (2006.01) |
| *B32B 1/08* | (2006.01) |
| *F02M 37/00* | (2006.01) |
| *B32B 5/02* | (2006.01) |
| *B32B 7/12* | (2006.01) |
| *B32B 25/04* | (2006.01) |
| *B32B 25/14* | (2006.01) |
| *B32B 27/12* | (2006.01) |
| *B32B 27/26* | (2006.01) |
| *B32B 27/30* | (2006.01) |
| *B32B 27/32* | (2006.01) |

(52) U.S. Cl.
CPC .............. *B32B 7/12* (2013.01); *B32B 25/042* (2013.01); *B32B 25/08* (2013.01); *B32B 25/10* (2013.01); *B32B 25/14* (2013.01); *B32B 27/12* (2013.01); *B32B 27/26* (2013.01); *B32B 27/30* (2013.01); *B32B 27/304* (2013.01); *B32B 27/306* (2013.01); *B32B 27/322* (2013.01); *F02M 37/0017* (2013.01); *F02M 37/0041* (2013.01); *F16L 11/081* (2013.01); *F16L 11/085* (2013.01); *B32B 2262/0223* (2013.01); *B32B 2262/0261* (2013.01); *B32B 2262/0276* (2013.01); *B32B 2307/54* (2013.01); *B32B 2307/7265* (2013.01); *B32B 2307/732* (2013.01); *B32B 2597/00* (2013.01)

(58) Field of Classification Search
USPC ......................... 138/125, 126, 132, 137, 141
See application file for complete search history.

(56) References Cited

U.S. PATENT DOCUMENTS

| | | | | |
|---|---|---|---|---|
| 5,941,286 A | * | 8/1999 | Fauble | ................ B29C 47/0023 138/137 |
| 6,089,277 A | * | 7/2000 | Kodama | .................. F16L 11/08 138/124 |
| 2001/0003995 A1 | | 6/2001 | Imaeda et al. | |
| 2002/0144743 A1 | | 10/2002 | Daikai et al. | |
| 2008/0053597 A1 | * | 3/2008 | Hatchett | ................. B32B 25/08 156/149 |
| 2008/0076873 A1 | | 3/2008 | Ogata et al. | |
| 2008/0236694 A1 | * | 10/2008 | Takagi | .................. F16L 11/082 138/109 |
| 2008/0236695 A1 | * | 10/2008 | Takagi | ...................... B32B 1/08 138/126 |
| 2009/0123683 A1 | * | 5/2009 | Miller | ....................... B32B 1/08 428/36.7 |
| 2010/0300571 A1 | * | 12/2010 | Miller | ....................... B32B 1/08 138/137 |
| 2011/0226375 A1 | * | 9/2011 | Harris | ....................... B32B 1/08 138/137 |
| 2013/0150503 A1 | | 6/2013 | Tanaka | |

FOREIGN PATENT DOCUMENTS

| | | |
|---|---|---|
| JP | 2000-55250 A | 2/2000 |
| JP | 2001-165383 A | 6/2001 |
| JP | 2002-228057 A | 8/2002 |
| JP | 2004-125121 A | 4/2004 |
| JP | 2006-272897 A | 10/2006 |
| JP | 2009-85298 A | 4/2009 |
| JP | 2012-62464 A | 3/2012 |
| WO | 2006/001363 A1 | 1/2006 |

OTHER PUBLICATIONS

International Search Report dated Jun. 9, 2015, issued in counterpart International Application No. PCT/JP2015/058166 (2 pages).

Office Action dated Oct. 3, 2017, issued in counterpart Japanese Application No. 2014-133877, with English machine translation. (15 pages).

* cited by examiner

FUEL HOSE

RELATED APPLICATION

This application is a continuation of International Application No. PCT/JP2015/58166, filed on Mar. 19, 2015, which claims priority to Japanese Patent Application No. 2014-133877, filed on Jun. 30, 2014, the entire contents of each of which are hereby incorporated by reference.

TECHNICAL FIELD

The present disclosure relates to a fuel hose and, more specifically, to an automotive fuel delivery hose for delivering a gasoline, an alcohol-containing gasoline, a diesel fuel or the like.

BACKGROUND ART

In a pipe arrangement for an automotive fuel supply system, a fuel hose defines a path for supplying a fuel pumped from a fuel pump, and is connected to a fuel delivery pipe. In the pipe arrangement, the fuel is pressurized to a predetermined constant pressure level in the hose by the pump for the delivery of the fuel. In a system adapted to deliver the fuel to an engine by a plurality of fuel delivery devices, pulsation (so-called fuel pressure fluctuation) is caused by one of the fuel delivery devices in the pipe arrangement, and a fuel pressure in the other fuel delivery device becomes higher or lower than a desired pressure level, so that the amount of the fuel to be injected is liable to be deviated from an intended level. Therefore, there is a demand for a fuel hose which is capable of suppressing the pulsation in the pipe arrangement. It is conceivable to use a resin hose, a rubber hose or a multi-layer hose including a resin layer and a rubber layer (see, for example, PTL 1) conventionally used as the fuel hose, but the following problems are encountered.

The resin hose has a fuel permeation resistance (fuel barrier property), but fails to suppress the pulsation because of its higher rigidity. The rubber hose is effective for suppressing the pulsation, but poorer in fuel permeation resistance (fuel barrier property). Further, the multi-layer hose including the inner resin layer and the rubber layer has difficulty in ensuring both the fuel permeation resistance (fuel barrier property) and the pulsation suppressing property.

Therefore, it is a conventional practice to use the fuel hose in combination with a damping component such as a pulsation damper (P/D) or to elongate the overall fuel hose for the suppression of the pulsation.

RELATED ART DOCUMENT

Patent Document

PTL 1: JP-A-HEI5(1993)-44874

SUMMARY OF INVENTION

However, the damping component such as the pulsation damper (P/D) is expensive, and the elongated fuel hose is costly. Therefore, a less costly fuel hose having the fuel permeation resistance (fuel barrier property) as well as the pulsation suppressing property is desired for a fuel injection system such as for a direct gasoline injection engine.

A less costly and highly durable fuel hose is provided which has the fuel permeation resistance (fuel barrier property) as well as the pulsation suppressing property.

The inventors conducted intensive studies to provide a fuel hose which is less costly and has the fuel permeation resistance (fuel barrier property) as well as the pulsation suppressing property. In the studies, the inventors focused on the layered structure of the fuel hose, and conceived a layered structure configured to include an inner tube including at least one rubber layer, a resin layer provided around an outer periphery of the inner tube and comprising a thermoplastic resin as a major component, and an outer tube provided around an outer periphery of the resin layer and including a reinforcement thread layer and a rubber layer. As a result of experiments focused on the dynamic loss (Tan δ) of the inner tube, the ratio of change in the outer diameter of the hose and the ratio of change in the volume of the hose, the fuel hose having an inner tube dynamic loss (Tan δ) of 0.3 to 1.2, and having an outer diameter change ratio of not greater than 10% and a volume change ratio of not less than 15% when the internal pressure of the hose is increased by 1 MPa was provided.

There is provided a fuel hose which includes an inner tube including at least one rubber layer, a resin layer provided around an outer periphery of the inner tube and comprising a thermoplastic resin as a major component, and an outer tube provided around an outer periphery of the resin layer and including a reinforcement thread layer and a rubber layer, the inner tube of the fuel hose having a dynamic loss (Tan δ) of 0.3 to 1.2, the fuel hose having an outer diameter change ratio of not greater than 10% and a volume change ratio of not less than 15% when the internal pressure of the hose is increased by 1 MPa.

The fuel hose includes the resin layer comprising the thermoplastic resin as a major component and, therefore, is excellent in fuel permeation resistance (fuel barrier property). The fuel hose has an inner tube dynamic loss (Tan δ) of 0.3 to 1.2 and, therefore, is excellent in damping property. Further, the fuel hose has an outer diameter change ratio of not greater than 10% and a volume change ratio of not less than 15% and, therefore, is excellent in pulsation suppressing property. Without the need for the expensive damping component such as the pulsation damper (P/D), the fuel hose is less costly, and has the fuel permeation resistance (fuel barrier property) as well as the pulsation suppressing property.

Where the inner tube has a wall thickness of 0.5 to 3 mm, the fuel hose is more excellent in fuel permeation resistance (fuel barrier property).

Where the resin layer has a thickness of 0.05 to 1 mm, the fuel hose is more excellent in fuel permeation resistance (fuel barrier property) and in pulsation suppressing property with an improved flexibility.

Where the at least one rubber layer of the inner tube has a tensile stress ($M_{100}$) of not greater than 5.0 MPa in a 25° C. atmosphere, the fuel hose is further more excellent in pulsation suppressing property.

Where the rubber layer of the outer tube comprises an epichlorohydrin rubber as a major component, a clamping arrangement for connection of the fuel hose to a pipe, a connector and the like can be easily designed.

Where the rubber layer of the inner tube comprises at least one of a fluororubber and an acrylonitrile-butadiene rubber as a major component, the fuel hose is excellent in fuel oil resistance.

Where the thermoplastic resin as the major component of the resin layer is at least one selected from the group consisting of a tetrafluoroethylene-perfluoro(alkyl vinyl ether) copolymer (PFA), a tetrafluoroethylene-hexafluoropropylene-vinylidene fluoride copolymer (THV), an ethylene vinyl alcohol copolymer resin (EVOH) and a polyamide 12, the fuel hose is further improved in fuel permeation resistance (fuel barrier property).

Where the fuel hose further includes a intermediate rubber layer provided between the resin layer and the outer tube, adhesiveness between the resin layer and the outer tube is improved.

DESCRIPTION OF EMBODIMENTS

Next, an embodiment of the present invention will be described in detail. However, it should be understood that the invention be not limited to this embodiment.

Figure 1:
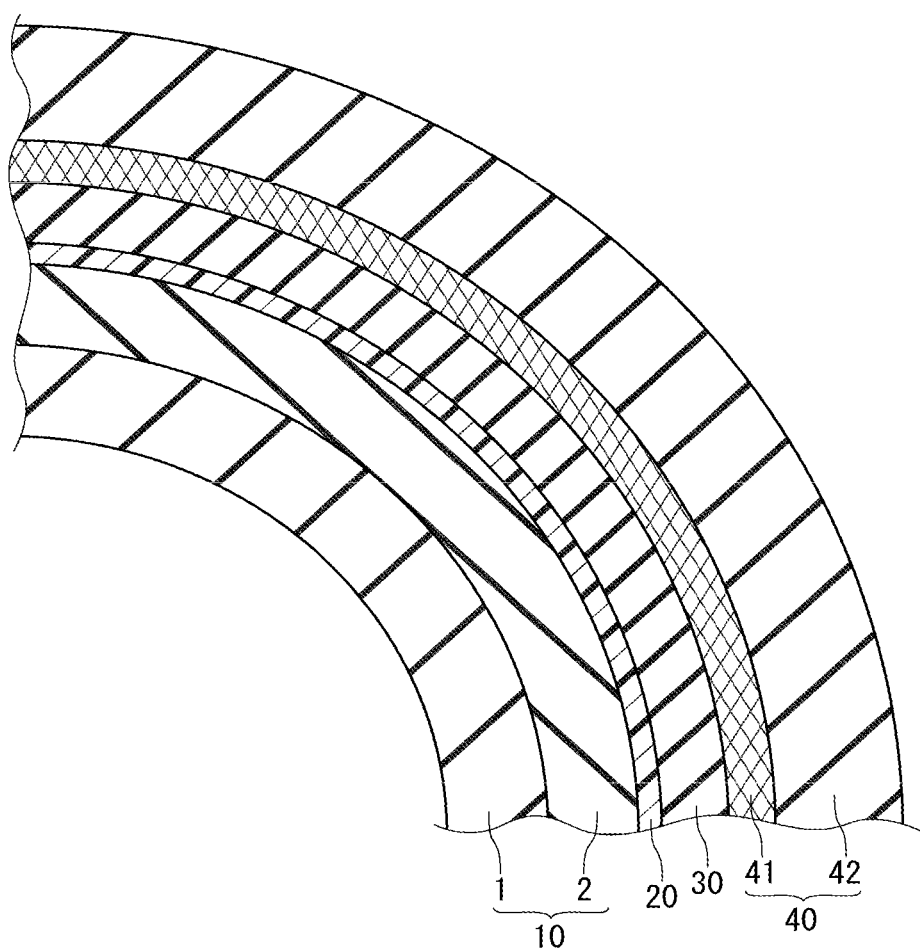
FIG. 1 is a sectional view illustrating a part of a fuel hose according to one embodiment of the present invention.

FIG. 1 is a sectional view illustrating a part (a fan-shaped part having a center angle of 90 degrees) of a fuel hose according to the embodiment of the present invention. For example, as shown in FIG. 1, the fuel hose according to the embodiment of the present invention (hereinafter referred to simply as "fuel hose") includes an inner tube 10, a resin layer 20, an intermediate layer 30 and an outer tube 40 provided in this order. The inner tube 10 includes a rubber layer 1 (innermost layer) and a rubber layer 2, and the outer tube 40 includes a reinforcement thread layer 41 and a rubber layer 42 (outermost layer).

The inner tube 10 has a dynamic loss (Tan δ) of 0.3 to 1.2, and the fuel hose has an outer diameter change ratio of not greater than 10% and a volume change ratio of not less than 15% when the internal pressure of the hose is increased by 1 MPa. These physical properties will be described later.

Materials for the respective layers of the fuel hose according to the embodiment of the present invention will be described in turn.

[Inner Tube 10]

In this embodiment, the inner tube 10 has a double layer structure including the innermost rubber layer 1 and the rubber layer 2 provided on an outer peripheral surface of the rubber layer 1. The structure of the inner tube 10 of the fuel hose is not limited to that shown in FIG. 1, but the inner tube 10 is merely required to include at least one rubber layer.

(Rubber Layer 1)

The rubber layer 1 is the innermost layer of the fuel hose. Examples of a rubber as a material for the rubber layer 1 include fluororubbers (FKM) and acrylonitrile-butadiene rubbers (NBR), among which the fluororubbers (FKM) are preferred.

As required, the material for the rubber layer 1 may contain ordinary additives (a vulcanizing agent, a crosslinking agent, a vulcanization accelerating agent and/or the like) in addition to the rubber.

(Rubber Layer 2)

The rubber layer 2 serves as an adhesive layer for bonding the rubber layer 1 to the resin layer 20. Preferred examples of a rubber as a material for the rubber layer 2 include acrylonitrile-butadiene rubbers (NBR) and epichlorohydrin-ethylene oxide copolymer rubbers (ECO).

As required, the material for the rubber layer 2 may contain the same additives (a vulcanizing agent, a crosslinking agent, a vulcanization accelerating agent and/or the like) as those for the rubber layer 1. In order to bond the rubber layer 2 to the resin layer 20 by vulcanization, the material for the rubber layer 2 preferably contains a sulfur vulcanizing agent or an amine crosslinking agent.

[Resin Layer 20]

The resin layer 20 is formed of a material containing a thermoplastic resin as a major component. In the present disclosure, the term "major component" means that the major component accounts for the majority of the material and the material may consist of the major component alone.

Examples of the thermoplastic resin preferred for the fuel permeation resistance (fuel barrier property) include tetrafluoroethylene-perfluoro(alkyl vinyl ether) copolymers (PFA), tetrafluoroethylene-hexafluoropropylene-vinylidene fluoride copolymers (THV), ethylene vinyl alcohol copolymer resins (EVOH) and polyamides 12, which may be used alone or in combination. Among these, the PEA is preferred, and tetrafluoroethylene-perfluoro(alkyl vinyl ether)-chlorotrifluoroethylene copolymers (CPT) are particularly preferred.

[Intermediate layer 30]

In the fuel hose according to the embodiment of the present invention, the intermediate layer 30 is optionally provided. However, it is preferred to provide the intermediate layer 30 for adhesion between the resin layer 20 and the outer tube 40.

The intermediate layer 30 serves as an adhesive layer for bonding the resin layer 20 to the outer tube 40 and, therefore, is preferably a rubber layer. Preferred examples of a rubber as a material for this rubber layer include acrylonitrile-butadiene rubbers (NBR) and epichlorohydrin-ethylene oxide copolymer rubbers (ECO).

As required, the material for the rubber layer as the intermediate layer 30 may contain the same additives (a vulcanizing agent, a crosslinking agent, a vulcanization accelerating agent and/or the like) as those for the rubber layer 1.

[Outer Tube 40]

The outer tube 40 includes the reinforcement thread layer 41 provided on an outer peripheral surface of the intermediate layer 30, and the rubber layer 42 (outermost layer) provided on an outer peripheral surface of the reinforcement thread layer 41.

(Reinforcement Thread Layer 41)

Examples of a reinforcement thread for formation of the reinforcement thread layer 41 include nylon reinforcement threads, and threads of aromatic polyamide (aramide) filaments, polyester filaments such as of polyethylene terephthalate (PET), nylon (polyamide) filaments such as of nylon 6 and nylon 66, and polyvinyl alcohol (vinylon) filaments, which may be used alone or in combination. Among these, the reinforcement threads of the aromatic polyamide (aramide) filaments and the polyvinyl alcohol (vinylon) filaments are preferred from the viewpoint of durability and pressure resistance.

Exemplary methods for forming the reinforcement thread layer from the reinforcement thread include a spirally winding method, a braiding method and a knitting method.

The reinforcement thread layer 41 preferably has a reinforcement thread winding angle or a reinforcement thread braiding angle of 40 to 60 degrees, particularly preferably 45 to 55 degrees.

(Rubber Layer 42)

The rubber layer 42 serves as the outermost layer of the fuel hose. Examples of a rubber as a material for the rubber layer 42 include epichlorohydrin polymer rubbers (CO), epichlorohydrin-ethylene oxide copolymer rubber (ECO) and epichlorohydrin-ethylene oxide-allyl glycidyl ether copolymer rubbers (GECO), which may be used alone or in combination.

As required, the material for the rubber layer 42 may contain the same additives (a vulcanizing agent, a crosslinking agent, a vulcanization accelerating agent and/or the like) as those for the rubber layer 1.

The fuel hose has the following characteristic properties (1) to (3):

(1) Dynamic Loss (Tan δ) of Inner Tube 10

The inner tube 10 has a dynamic loss (Tan δ) of 0.3 to 1.2, preferably 0.5 to 1.2. If the dynamic loss (Tan δ) of the inner tube 10 is excessively small, the fuel hose tends to be poorer in a pulsation suppressing property.

The dynamic loss (Tan δ) may be measured, for example, in conformity with JIS K6394.

(2) Hose Outer Diameter Change Ratio

The fuel hose has an outer diameter change ratio of not greater than 10%, preferably not greater than 7%, when the internal pressure of the hose is increased by 1 MPa. If the hose outer diameter change ratio is excessively great, the fuel hose is liable to be poorer in durability.

The hose outer diameter change ratio may be measured, for example, in conformity with "7.2 Dimensional Change Test under Pressurization" specified in JIS K6330-2-2013, more specifically, by means of a test apparatus to be described later with reference to FIG. 2.

(3) Hose Volume Change Ratio

The fuel hose has a volume change ratio of not less than 15%, preferably not less than 20%, when the internal pressure of the hose is increased by 1 MPa. If the hose volume change ratio is excessively small, the fuel hose is liable to be poorer in a pulsation suppressing property.

The hose volume change ratio may be measured, for example, by a test apparatus to be described later with reference to FIG. 2.

In the embodiment of the present invention, the at least one rubber layer of the inner tube 10 preferably has a tensile stress ($M_{100}$) of not greater than 5.0 MPa, particularly preferably not greater than 4.0. MPa, in a room temperature atmosphere (at 25° C.) from the viewpoint of the flexibility.

The tensile stress ($M_{100}$) may be measured, for example, in conformity with JIS K6251.

Next, a method of producing the fuel hose according to the embodiment of the present invention will be described specifically. First, the material for the rubber layer 1 and the material for the rubber layer 2 of the inner tube 10 are prepared. Similarly, the material for the intermediate rubber layer 30 and the material for the rubber layer 42 of the outer tube 40 are prepared. Then, the material for the rubber layer 1 and the material for the rubber layer 2 of the inner tube 10 are coextruded, whereby the rubber layer 2 is formed around a surface of the tubular rubber layer 1. In turn, the material for the resin layer 20 and the material for the intermediate layer 30 are extruded around a surface of the rubber layer 2, whereby the intermediate layer 30 is formed around a surface of the resin layer 20. Subsequently, the reinforcement thread is spirally wound around a surface of the intermediate layer 30 to form the reinforcement thread layer 41. Then, the material for the rubber layer 42 is extruded around a surface of the reinforcement thread layer 41, whereby the rubber layer 42 is formed as the outermost layer. Thereafter, as required, the rubber layers are primarily and secondarily vulcanized. By thus successively extruding the materials by means of an extruder, the fuel hose is produced which includes the inner tube 10 including the rubber layer 1 (innermost layer) and the rubber layer 2, the resin layer 20, the intermediate layer 30 and the outer tube 40 including the reinforcement thread layer 41 and the rubber layer 42 (outermost layer) successively formed in this order. The hose is inserted in a mandrel, and then steam-vulcanized, for example, at 160° C. for 1 hour. In the aforementioned production method, the material for the rubber layer 1 and the material for the rubber layer 2 are coextruded, but the method for the formation of the rubber layer 1 and the rubber layer 2 is not limited to the coextrusion. The rubber layer 1 may be first formed by extrusion of the material for the rubber layer 1, and then the rubber layer 2 may be formed around the surface of the rubber layer 1 by extrusion of the material for the rubber layer 2.

The thicknesses of the respective layers of the fuel hose according to the embodiment of the present invention are as follows. The wall thickness of the inner tube 10 is preferably 0.5 to 3 mm, particularly preferably 0.5 to 1.5 mm. The thickness of the resin layer 20 is preferably 0.05 to 1.0 mm, particularly preferably 0.05 to 0.3 mm. The thickness of the intermediate layer 30 is typically 0.5 to 1.5 mm, preferably 0.5 to 1.0 mm. The thickness of the reinforcement thread layer 41 is preferably 0.1 to 1.0 mm, particularly preferably 0.1 to 0.3 mm. The thickness of the rubber layer 42 is preferably 0.5 to 2.0 mm, particularly preferably 0.5 to 1.0 mm.

The fuel hose according to the embodiment of the present invention typically has an inner diameter of 2 to 25 mm, preferably 5 to 15 mm. The fuel hose typically has an outer diameter of 5 to 35 mm, preferably 10 to 25 mm.

The structure of the fuel hose according to the embodiment of the present invention is not limited to that shown in FIG. 1. The inner tube 10 is merely required to include at least one rubber layer, and the number of the rubber layers is not limited to two. The outer tube 40 is merely required to include the reinforcement thread layer 41 and the rubber layer 42. An additional rubber layer may be provided between the reinforcement thread layer 41 and the rubber layer 42, or provided on an inner peripheral surface of the reinforcement thread layer 41 or on an outer peripheral surface of the rubber layer 42. As described above, the intermediate layer 30 may be obviated.

EXAMPLES

Next, inventive examples will be described in conjunction with comparative examples. It should be understood that the present disclosure be not limited to these inventive examples.

Example 1

Preparation of Rubber Composition for Inner Tube

By means of a kneader and rolls, 100 parts by weight of a fluororubber. (FKM) (DAI-EL G-555 available from Daikin Industries, Ltd.), 15 parts by weight of carbon black (SEAST S available from Tokai Carbon Co., Ltd.), 3 parts by weight of MgO (KYOWA MAG #150 available from Kyowa Chemical Industry Co, Ltd.) and 6 parts by weight of CaO (CAL-Z available from Ohmi Chemical Industry Co., Ltd.) were kneaded together, whereby a rubber composition for an inner tube was prepared.

(Material for Resin Layer)

Pellets of a tetrafluoroethylene-perfluoro(alkyl vinyl ether)-chlorotrifluoroethylene copolymer (CPT) (NEOFLON CPT LP-1000 available from Daikin. Industries, Ltd.) were prepared.

(Preparation of Rubber Composition for Intermediate Layer)

First, 100 parts by weight of an NBR (NIPOL DN003 available from Nippon Zeon Co., Ltd. and having an AN amount of 50), 1 part by weight of sulfur (GOLDEN FLOWER sulfur powder available from Tsurumi Chemical Industry Co., Ltd.), 1 part by weight of DBU naphthoate (DA-500 available from Daiso Co., Ltd.), 10 parts by weight of magnesium oxide (KYOWA MAG 150 available from Kyowa Chemical Industry Co., Ltd.), 1 part by weight of stearic acid (BEADS STEARIC ACID SAKURA available from NOF Corporation), 45 parts by weight of carbon black (SHOWBLACK N330 available from Cabot Japan K.K.), 25 parts by weight of basic silica (CARPLEX 1120 available from DSL Japan Co., Ltd.), 25 parts by weight of an ether ester plasticizer (ADEKACIZER RS107 available from ADEKA Corporation), 1 part by weight of a sulfenamide vulcanization accelerating agent (N-oxydiethylene-2-benzothiazolyl sulfenamide (OBS) NOCCELER MSA available from Ouchi Shinko Chemical Industrial Co., Ltd.) and 1 part by weight of a vulcanizing agent SULFAX T-10 (available from Tsurumi Chemical Industry Co., Ltd.) were blended together, and kneaded by means of a Banbury mixer and rolls, whereby a rubber composition for an intermediate layer was prepared.

(Preparation of Rubber Composition for Outer Tube)

By means of open rolls, a kneader or other sealed mixer, 100 parts by weight of an epichlorohydrin-ethylene oxide-allyl glycidyl ether copolymer rubber (GECO) (EPICHLOMER CG available from Daiso Co., Ltd.), 50 parts by weight of carbon black (SEAST SO available from Tokai Carbon Co., Ltd.), 5 parts by weight of a plasticizer (ADEKACIZER RS107 available from ADEKA Corporation), 1 part by weight of an anti-aging agent (NOCRAC NBC available from Ouchi Shinko Chemical Industrial Co., Ltd.), 3 parts by weight of a processing aid (EMASTER 510P available from Riken Vitamin Co., Ltd.), 1 part by weight of DSU naphthoate (DA500 available from Daiso Co., Ltd.), 3 parts by weight of an acid accepting agent (DHT-4A available from Kyowa Chemical Industry Co., Ltd.), 1 part by weight of a vulcanizing agent (SANCELER 22C available from Sanshin Chemical Industry Co., Ltd.), 1.2 parts by weight of a peptizing agent (NOCTIZER SS available from Ouchi Shinko Chemical Industrial Co., Ltd.) and 0.1 part by weight of a vulcanizing agent (SULFAX T-10 available from Karuizawa Seirenjo Co., Ltd.) were kneaded together, whereby a rubber composition for the outer tube was prepared.

(Production of Fuel Hose)

The rubber composition for the inner tube was extruded to form the inner tube, and then the material for the resin layer and the rubber composition for the intermediate layer were respectively extruded around an outer peripheral surface of the inner tube. In turn, a para-aromatic polyamide filament (having a filament fineness of 1000 denier) was braided at a predetermined braiding angle around the resulting intermediate layer to form the reinforcement thread layer. In turn, the rubber composition for the outer tube was extruded around a surface of the reinforcement thread layer. Then, the resulting layers were vulcanized. Thus, a fuel hose having a length of 400 mm and an inner diameter of 7.5 mm was produced as including an inner tube (rubber layer) having a wall thickness of 1.0 mm, a resin layer having a thickness of 0.1 mm, an intermediate layer (rubber layer) having a thickness of 0.6 mm and an outer tube having a wall thickness of 1.0 mm with the reinforcement thread braided at a braiding angle of 50 degrees.

Example 2

The same materials as used as the rubber composition for the inner tube, the material for the resin layer, the rubber composition for the intermediate layer, the reinforcement thread and the rubber composition for the outer tube in Example 1 were used. A fuel hose was produced in substantially the same manner as in Example 1, except that the braiding angle of the reinforcement thread was changed.

Example 3

A fuel hose was produced in substantially the same manner as in Example 1, except that a rubber composition prepared in the following manner for the inner tube was used to change the dynamic loss (Tan δ) of the inner tube.

(Preparation of Rubber Composition for Inner Tube)

First, 100 parts by weight of an NBR (NIPOL DN003 available from Nippon Zeon Co., Ltd. and having an AN amount of 50), 1 part by weight of sulfur (GOLDEN FLOWER sulfur powder available from Tsurumi Chemical Industry Co., Ltd.), 1 part by weight of DBU naphthoate (DA-500 available from Daiso Co., Ltd.), 10 parts by weight of magnesium oxide (KYOWA MAG 150 available from Kyowa Chemical Industry Co., Ltd.), 1 part by weight of stearic acid (BEADS STEARIC ACID SAKURA available from NOF Corporation), 45 parts by weight of carbon black (SHOWBLACK N330 available from Cabot Japan K.K.), 25 parts by weight of basic silica (CARPLEX 1120 available from DSL Japan Co., Ltd.), 25 parts by weight of an ether ester plasticizer (ADEKACIZER RS107 available from ADEKA Corporation), 1 part by weight of a sulfenamide vulcanization accelerating agent (N-oxydiethylene-2-benzothiazolyl sulfenamide (OBS) NOCCELER MSA available from Ouchi Shinko Chemical industrial Co., Ltd.) and 1 part by weight of a vulcanizing agent SULFAX T-10 (available from Tsurumi Chemical Industry Co., Ltd.) were blended together, and kneaded by means of a Banbury mixer and rolls, whereby the rubber composition for the inner tube was prepared.

Example 4

A fuel hose was produced in substantially the same manner as in Example 1, except that a rubber composition prepared in the following manner for the inner tube was used to change the dynamic loss (Tan δ) of the inner tube.

(Preparation of Rubber Composition for Inner Tube)

First, 100 parts by weight of an NBR (NIPOL DN003 available from Nippon Zeon Co., Ltd. and having an AN amount of 50), 1 part by weight of sulfur (GOLDEN FLOWER sulfur powder available from Tsurumi Chemical Industry Co., Ltd.), 1 part by weight of DBU naphthoate (DA-500 available from Daiso Co., Ltd.), 10 parts by weight of magnesium oxide (KYOWA MAG 150 available from Kyowa Chemical Industry Co., Ltd.), 1 part by weight of stearic acid (BEADS STEARIC ACID SAKURA available from NOF Corporation), 40 parts by weight of carbon black (SHOWBLACK N330 available from Cabot Japan K.K.), 20 parts by weight of basic silica (CARPLEX 1120 available from DSL Japan Co., Ltd.), 25 parts by weight of an ether ester plasticizer (ADEKACIZER RS107 available from ADEKA Corporation), 1 part by weight of a sulfenamide vulcanization accelerating agent (N-oxydiethylene-2-benzothiazolyl sulfenamide (OBS) NOCCELER MSA available from Ouchi Shinko Chemical industrial Co., Ltd.) and 1.2 parts by weight of a vulcanizing agent SULFAX T-10 (available from Tsurumi Chemical Industry Co., Ltd.) were blended together, and kneaded by means of a Banbury mixer and rolls, whereby the rubber composition for the inner tube was prepared.

Example 5

A fuel hose was produced in substantially the same manner as in Example 1, except that a rubber composition prepared in the following manner for the inner tube was used to change the dynamic loss (Tan δ) of the inner tube.

(Preparation of Rubber Composition for Inner Tube)

By means of a kneader and rolls, 100 parts by weight of a fluororubber (FKM) (DAI-EL G-555 available from Daikin Industries, Ltd.), 15 parts by weight of barium sulfate (W-1 available from Takehara Kagaku Kogyo Co., Ltd.), 3 parts by weight of MgO (KYOWA MAC #150 available from Kyowa Chemical Industry Co., Ltd.) and 6 parts by weight of CaO (CAL-Z available from Ohmi Chemical industry Co., Ltd.) were kneaded together, whereby the rubber composition for the inner tube was prepared.

Example 6

The same materials as used as the rubber composition for the inner tube, the material for the resin layer, the rubber composition for the intermediate layer, the reinforcement thread and the rubber composition for the outer tube in Example 1 were used. A fuel hose was produced in substantially the same manner as in Example 1, except that the braiding angle of the reinforcement thread was changed.

Comparative Example 1

A fuel hose was produced in substantially the same manner as in Example 1, except that the resin layer was not formed between the inner tube and the intermediate layer.

Comparative Example 2

A fuel hose including a tubular electrically conductive ETFE (coed-ETFE) layer, an ETFE layer provided around a surface of the electrically conductive ETFE layer and a PA layer provided around a surface of the ETFE layer was produced. More specifically, an electrically conductive ETFE modified with a carboxylic anhydride (FLUON AH-3000 available from Asahi Glass Co., Ltd.), an ETFE (FLUON AH-2000 available from Asahi Glass Co., Ltd.) and a PA12 (LX9011 available from Evonic GmbH) were extruded, whereby the fuel hose was produced as having a triple layer structure (including the electrically conductive ETFE layer, the ETFE layer and the PA12 layer).

Comparative Example 3

The same materials as used as the rubber composition for the inner tube, the material for the resin layer, the rubber composition for the intermediate layer, the reinforcement thread and the rubber composition for the outer tube in Example 1 were used. A fuel hose was produced in substantially the same manner as in Example 1, except that the braiding angle of the reinforcement thread was changed.

Comparative Example 4

A fuel hose was produced in substantially the same manner as in Example 1, except that a rubber composition prepared in the following manner for the inner tube was used to change the dynamic loss (Tan δ) of the inner tube and the braiding angle of the reinforcement thread was changed.

(Preparation of Rubber Composition for Inner Tube)

First, 100 parts by weight of an NBR (NIPOL DN003 available from Nippon Zeon Co., Ltd. and having an AN amount of 50), 1 part by weight of sulfur (GOLDEN FLOWER sulfur powder available from Tsurumi Chemical Industry Co., Ltd.), 1 part by weight of DBU naphthoate (DA-500 available from Daiso Co., Ltd.), 10 parts by weight of magnesium oxide (KYOWA MAG 150 available from Kyowa Chemical Industry Co., Ltd.), 1 part by weight of stearic acid (BEADS STEARIC ACID SAKURA available from NOF Corporation), 35 parts by weight of carbon black (SHOWBLACK N330 available from Cabot Japan K.K.), 15 parts by weight of basic silica (CARPLEX 1120 available from DSL Japan Co., Ltd.), 25 parts by weight of an ether ester plasticizer (ADEKACIZER RS107 available from ADEKA Corporation), 1 part by weight of a sulfenamide vulcanization accelerating agent (N-oxydiethylene-2-benzothiazolyl sulfenamide (OBS) NOCCELER MSA available from Ouchi Shinko Chemical industrial Co., Ltd.) and 1.5 parts by weight of a vulcanizing agent SULFAX T-10 (available from Tsurumi Chemical Industry Co., Ltd.) were blended together, and kneaded by means of a Banbury mixer and rolls, whereby the rubber composition for the inner tube was prepared.

TABLE 1

|  | Example | | | | | |
| --- | --- | --- | --- | --- | --- | --- |
|  | 1 | 2 | 3 | 4 | 5 | 6 |
| Inner tube | FKM | FKM | NBR | NBR | FKM | FKM |
|  | 1.0 mm | 1.0 mm | 1.0 mm | 1.0 mm | 1.0 mm | 1.0 mm |
| Resin layer | CPT | CPT | CPT | CPT | CPT | CPT |
|  | 0.1 mm | 0.1 mm | 0.1 mm | 0.1 mm | 0.1 mm | 0.1 mm |
| Intermediate layer | NBR | NBR | NBR | NBR | NBR | NBR |
|  | 0.6 mm | 0.6 mm | 0.6 mm | 0.6 mm | 0.6 mm | 0.6 mm |
| Reinforcement thread layer (braiding angle) | 50 degress | 60 degress | 50 degress | 50 degress | 50 degress | 45 degress |
| Rubber layer | GECO | GECO | GECO | GECO | GECO | GECO |
|  | 1.0 mm | 1.0 mm | 1.0 mm | 1.0 mm | 1.0 mm | 1.0 mm |
| tanδ | 0.8 | 0.8 | 0.5 | 0.3 | 1.2 | 0.8 |

TABLE 1-continued

| | Example | | | | | |
|---|---|---|---|---|---|---|
| | 1 | 2 | 3 | 4 | 5 | 6 |
| $M_{100}$ (MPa) | 5.0 | 5.0 | 5.0 | 5.0 | 5.0 | 5.0 |
| Hose outer diameter change ratio (%) | 7 | 2 | 7 | 7 | 7 | 10 |
| Hose volume change ratio (%) | 34 | 20 | 26 | 21 | 39 | 41 |
| Pulsation suppressing property Δp (KPa) | 78 | 95 | 85 | 91 | 71 | 70 |
| | ○ | Δ | ○ | ○ | ○ | ○ |
| Fuel barrier property | ○ | ○ | ○ | ○ | ○ | ○ |
| Durability | ○ | ○ | ○ | ○ | ○ | ○ |

TABLE 2

| | Comparative Example | | | |
|---|---|---|---|---|
| | 1 | 2 | 3 | 4 |
| Inner tube | FKM | cond-EIFE | FKM | NBR |
| | 1.0 mm | 0.1 mm | 1.0 mm | 1.0 mm |
| Resin layer (rubber layer) | — | EIFE | CPT | CPT |
| | — | 0.1 mm | 0.1 mm | 0.1 mm |
| Intermediate layer | NBR | — | NBR | NBR |
| | 0.6 mm | — | 0.6 mm | 0.6 mm |
| Reinforcement thread layer (braiding angle) | 50 degrees | — | 40 degrees | 60 degrees |
| Rubber layer (resin layer) | GECO | PA12 | GECO | GECO |
| | 1.0 mm | 0.8 mm | 1.0 mm | 1.0 mm |
| tanδ | 0.8 | 0.05 | 0.8 | 0.2 |
| $M_{100}$ (MPa) | 5.0 | 25.0 | 5.0 | 5.0 |
| Hose outer diameter change ratio (%) | 10 | 0.1 | 12 | 2 |
| Hose volume change ratio (%) | 29 | 4 | 43 | 13 |
| Pulsation suppressing property Δp (KPa) | 87 | 145 | 68 | 103 |
| | ○ | x | ○ | x |
| Fuel barrier property | x | ○ | ○ | ○ |
| Durability | ○ | ○ | x | ○ |

<<Evaluation>>

The fuel hoses of Examples and Comparative Examples were evaluated for characteristic properties based on the following criteria. The results are shown in Tables 1 and 2.

[Dynamic Loss (Tan δ) and Tensile Stress ($M_{100}$) of Inner Tube]

The dynamic loss (Tan δ) of the inner tube was measured in a room temperature atmosphere (at 25° C.) in conformity with JIS K6394. Further, the tensile stress ($M_{100}$) of the inner tube was measured in conformity with JIS K6251.

[Measurement of Hose Outer Diameter Change Ratio and Hose Volume Change Ratio]

Figure 2:
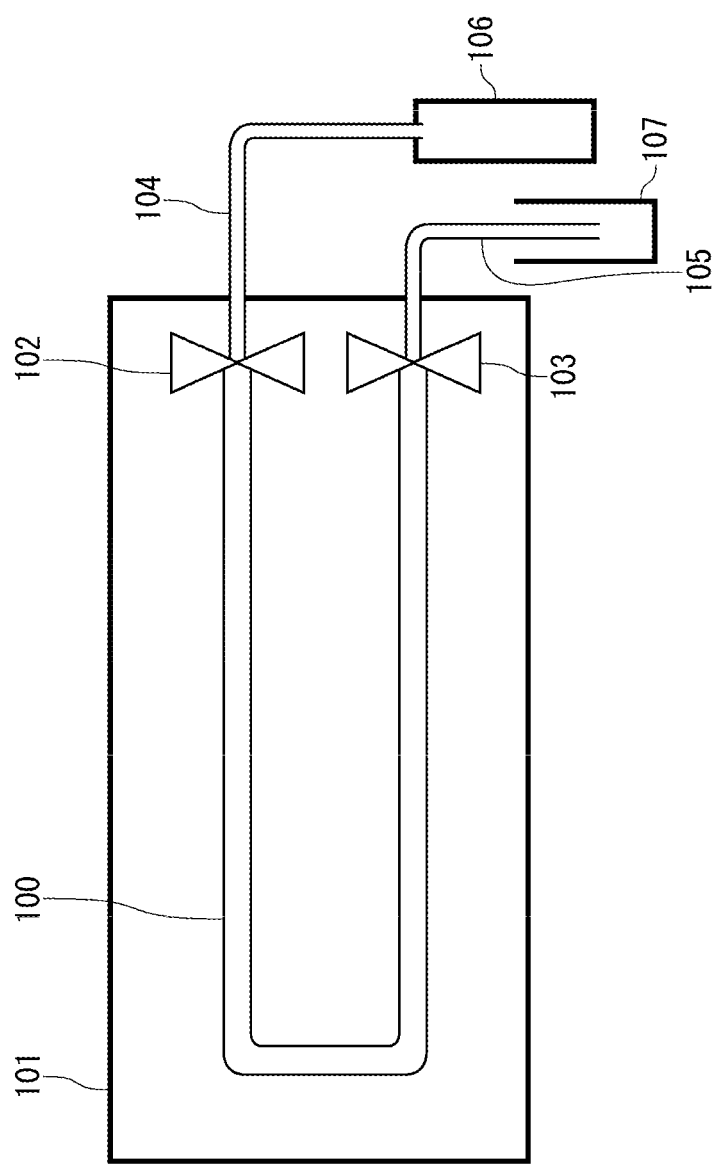
FIG. 2 is a schematic diagram illustrating a test apparatus for measuring a hose outer diameter change ratio and a hose volume change ratio.

FIG. 2 illustrates a test apparatus for measuring a hose outer diameter change ratio and a hose volume change ratio. In FIG. 2, reference numerals 100 and 101 designate a sample hose and a thermostat chamber, respectively. Reference numerals 102 and 103 designate valves, and reference numerals 104 and 105 designate pipes. Reference numerals 106 and 107 designate a pump and a measuring cylinder, respectively.

The sample hose 100 was produced by cutting each of the fuel hoses of Examples and Comparative Examples (each having a length of 400 mm) to a length of 200 mm. The pipes 104, 105 were respectively inserted into opposite ends of the sample hose 100 via the valves 102, 103 (with a pipe insertion length of 25 mm). The sample hose 100 was set in the thermostat chamber 101 and allowed to stand at a room temperature (18° C.) for hour.

(Hose Outer Diameter Change Ratio)

The valves 102, 103 were opened to degas the sample hose 100. After the degassing, the valve 103 was closed, and the sample hose 100 was pressurized (by using LLC as a pressurization medium) to increase the internal pressure thereof to a predetermined pressure level (to increase the internal pressure by an evaluation pressure increment of 200 KPa to a maximum pressure of 1 MPa). After the pressurized state was maintained for 30 seconds, the outer diameter ($r_1$) of the hose was measured. Then, the hose outer diameter change ratio was calculated from the following expression, wherein $r_0$ is the initial outer diameter of the sample hose before the pressurization of the sample hose 100.

Hose outer diameter change ratio (%)=$(r_1-r_0)/r_0\times 100$ (Hose Volume Change Ratio)

With the valve 102 closed and with the valve 103 open, the amount of the medium discharged from the sample hose 100 was measured by means of the measuring cylinder 107. Then, the hose volume change ratio was calculated from the following expression, wherein V is a discharge amount at the pressurization and $V_0$ is the initial volume of the hose 100 before the pressurization of the hose 100.

Hose volume change ratio (%)=$(\Delta V/V_0)\times 100$

[Pulsation Suppressing Property]

Figure 3:
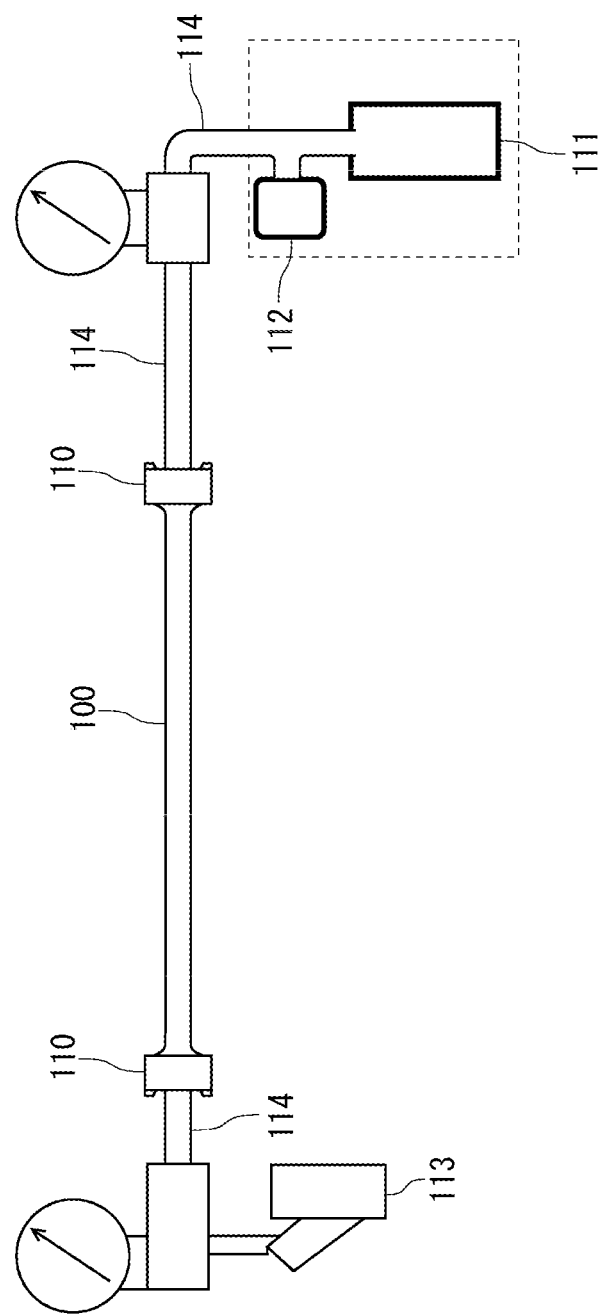
FIG. 3 is a schematic diagram illustrating a test apparatus for evaluating a pulsation suppressing property.

FIG. 3 illustrates a test apparatus for evaluating the fuel hose for the pulsation suppressing property. In FIG. 3, reference numerals 100, 110, 111, 112, 113 and 114 designate a sample hose, quick connectors, a fuel pump, a regulator, an injector and pipes, respectively.

The sample hose 100 was prepared by cutting each of the fuel hoses of Examples and Comparative Examples (each having a length of 400 mm) to a length of 200 mm. Then, ΔP was calculated in the following manner. In evaluation, a sample hose having a ΔP greater than 100 KPa was rated as unacceptable (x), and a sample hose having a ΔP not less than 95 KPa and not greater than 100 KPa was rated as acceptable (Δ). A sample hose having a ΔP less than 95 KPa was rated as excellent (o).

(Measuring Conditions)
Injector frequency: 120 msec (1000 rpm assumed)
Injector valve opening period: 6 (msec)
Evaluation temperature: Room temperature (25° C.)
Measuring position: A fuel pressure (P) was measured at the injector.
Test fluid: SHELLSOL (1) The sample hose 100 was set in the apparatus as shown in FIG. 3, then allowed to stand at a room temperature (25° C.) for 1 hour, and degassed.

(2) The sample hose was maintained in this state for about 30 minutes until the internal oil temperature of the fuel pump 111 became constant (was stabilized at about 50° C.)

(3) The valve opening period of the injector 113 was set to 6 msec.

(4) Peak values were read from a graph of the measurement result, and ΔP was calculated from the following expression:

$$\Delta P (KPa) = P\max - P\min$$

[Fuel Permeation Resistance (Fuel Barrier Property)]

A fuel mixture (FC/E10) was prepared as an evaluation test gasoline by mixing 100 parts by volume of Fuel C (having a toluene/isooctane ratio of 50/50 (vol. %)) and 10 parts by volume of ethanol, and sealed in the hose with opposite ends of the hose closed. The resulting hose was allowed to stand at 40° C. for 1000 hours to be stabilized. Thereafter, the content (fuel mixture) was removed from the hose, and the fuel mixture (FC/E10) was newly sealed in the hose. Then, the resulting hose was allowed to stand in a predetermined temperature cycle environment, and the fuel permeation amount was measured every 24 hours. In evaluation, a hose having a fuel permeation amount of not greater than 50 (mg/test) was rated as acceptable (o), and a hose having a fuel permeation amount of greater than 50 (mg/test) was rated as unacceptable (x).

[Durability]

An impulse durability test was performed at a test temperature of 80° C. at a test pressure of 1 MPa on each of the fuel hoses in conformity with JIS K6330-8 (1998). In evaluation, a hose free from abnormality even after being repeatedly pressurized 1,000,000 times was rated as acceptable (o), and a hose suffering from rupture, leakage or other abnormality was rated as unacceptable (x).

As can be understood from the results shown in Tables 1 and 2, the hoses of Examples 1 to 6 which each have an inner tube dynamic loss (Tan δ) of 0.3 to 1.2, a hose outer diameter change ratio of not greater than 10% and a hose volume change ratio of not less than 15% are more excellent in a pulsation suppressing property, fuel permeation resistance (fuel barrier property) and durability than the hoses of Comparative Examples 1 to 4.

In contrast, the hose of Comparative Example 1 having no resin layer between the inner tube and the intermediate layer is poorer in fuel permeation resistance (fuel barrier property).

The hose of Comparative Example 2 having a volume change ratio of less than 15% is poorer in a pulsation suppressing property.

The hose of Comparative Example 3 having an outer diameter change ratio of greater than 10% is poorer in durability.

The hose of Comparative Example 4 having an inner tube dynamic loss (Tan δ) of less than 0.3 is poorer in a pulsation suppressing property.

While specific forms of the embodiment of the present invention have been shown in the aforementioned inventive examples, the inventive examples are merely illustrative of the disclosure but not limitative of the disclosure. It is contemplated that various modifications apparent to those skilled in the art could be made within the scope of the disclosure.

The inventive fuel hose can be used for a fuel injection system.

REFERENCE SIGNS LIST

1: Rubber layer
2: Rubber layer
10: Inner tube
20: Resin layer
40: Outer tube
41: Reinforcement thread layer (Reinforcement thread)
42: Rubber layer

The invention claimed is:

1. A fuel hose comprising:
    an inner tube including at least one rubber layer;
    a resin layer provided around an outer periphery of the inner tube and comprising a thermoplastic resin as a major component; and
    an outer tube provided around an outer periphery of the resin layer and including a reinforcement thread layer and a rubber layer;
    wherein the inner tube of the fuel hose has a dynamic loss (Tan δ) of 0.3 to 1.2;
    wherein the fuel hose has an outer diameter change ratio of not greater than 10% and a volume change ratio of not less than 15% when an internal pressure of the hose is increased by 1 MPa;
    wherein the rubber layer of the inner tube comprises at least one of a fluororubber and an acrylonitrile-butadiene rubber as a major component;
    wherein the thermoplastic resin of the resin layer is at least one selected from the group consisting of a tetrafluoroethylene-perfluoro(alkyl vinyl ether) copolymer (PFA), a tetrafluoroethylene-hexafluoropropylene-vinylidene fluoride copolymer (THV), an ethylene vinyl alcohol copolymer resin (EVOH) and a polyamide 12;
    wherein the reinforcement thread layer is a layer formed from at least one type of thread selected from the group consisting of a nylon reinforcement thread, a thread of an aromatic polyamide filament, a thread of a polyester filament, a thread of a nylon filament and a thread of a polyvinyl alcohol filament; and
    wherein the reinforcement thread layer has a reinforcement thread winding angle or a reinforcement thread braiding angle of 45 to 55 degrees.

2. The fuel hose according to claim 1, wherein the inner tube has a wall thickness of 0.5 to 3 mm.

3. The fuel hose according to claim 1, wherein the resin layer has a thickness of 0.05 to 1 mm.

4. The fuel hose according to claim 1, wherein the at least one rubber layer of the inner tube has a tensile stress ($M_{100}$) of not greater than 5.0 MPa in 25° C. atmosphere.

5. The fuel hose according to claim 1, wherein the rubber layer of the outer tube comprises an epichlorohydrin rubber as a major component.

6. The fuel hose according to claim 1, further comprising an intermediate rubber layer provided between the resin layer and the outer tube.

7. The fuel hose according to claim 6, wherein the intermediate layer is at least one of an acrylonitrile-butadiene rubber (NBR) and an epichlorohydrin-ethylene oxide copolymer rubber (ECO) as a major component.

8. The fuel hose according to claim 6, wherein the intermediate layer has a thickness of 0.5 to 1.5 mm.

9. The fuel hose according to claim 1,
wherein the inner tube includes two rubber layers,
wherein an inner layer of the two rubber layers comprises a fluororubber as a major component,
wherein an outer layer of the two rubber layers comprises at least one of an acrylonitrile-butadiene rubber (NBR) and an epichlorohydrin-ethylene oxide copolymer rubber (ECO) as a major component.

10. The fuel hose according to claim 1, wherein the thermoplastic resin of the resin layer is a tetrafluoroethylene-perfluoro(alkyl vinyl ether)-chlorotrifluoroethylene copolymer (CPT).

11. The fuel hose according to claim 1, wherein the reinforcement thread layer is a layer formed by one of a spirally winding method, a braiding method and a knitting method.

12. The fuel hose according to claim 1, wherein the rubber layer of the outer tube comprises at least one selected from the group consisting of an epichlorohydrin polymer rubber (CO), an epichlorohydrin-ethylene oxide copolymer rubber (ECO) and an epichlorohydrin-ethylene oxide-ally glycidyl ether copolymer rubber (GECO) as a major component.

13. The fuel hose according to claim 1, wherein the reinforcement thread layer of the outer tube has a thickness of 0.1 to 1.0 mm.

14. The fuel hose according to claim 1, wherein the rubber layer of the outer tube has a thickness of 0.5 to 2.0 mm.

15. The fuel hose according to claim 1, wherein the fuel hose has an inner diameter of 2 to 25 mm.

16. The fuel hose according to claim 1, wherein the fuel hose has an outer diameter of 5 to 35 mm.

* * * * *